United States Patent [19]

Ford

[11] 3,983,260
[45] Sept. 28, 1976

[54] QUICK COOLING PRESSURE COOKER SYSTEM

[75] Inventor: Karl L. Ford, Muncie, Ind.

[73] Assignee: Ball Corporation, Muncie, Ind.

[22] Filed: Sept. 20, 1974

[21] Appl. No.: 567,994

[52] U.S. Cl. .................... 426/403; 21/95; 21/80; 21/98; 21/103; 99/359; 99/483; 99/361; 126/377; 426/407
[51] Int. Cl.² .................................. B65B 55/02
[58] Field of Search ........... 426/403, 407, 409, 397; 99/470, 483, 484, 359, 370, 361; 21/56, 95, 97, 80, 105, 98, 103; 126/377

[56] References Cited
UNITED STATES PATENTS

| | | | |
|---|---|---|---|
| 1,094,380 | 4/1914 | Tait | 426/409 X |
| 1,881,855 | 10/1932 | Mullen | 426/407 |
| 2,043,310 | 6/1936 | Thompson | 426/407 |
| 2,555,230 | 5/1951 | Ford | 426/403 |
| 2,676,891 | 4/1954 | Wilbur | 426/407 |
| 3,215,538 | 11/1965 | Sada | 426/407 X |
| 3,730,565 | 5/1973 | Steudler, Jr. | 285/DIG. 16 X |
| 3,897,818 | 8/1975 | Champel | 21/56 X |

Primary Examiner—Frank W. Lutter
Assistant Examiner—N. Greenblum
Attorney, Agent, or Firm—James D. Haynes

[57] ABSTRACT

A method and apparatus for processing food which significantly reduces the time required for cooling. A stream of water is directed onto selected metal lids of jars without risking breakage thereof, while at the same time eliminating the need for an air compressor to maintain the pressure within the pressure cooker during cooling. Pressure within the jars is reduced before or at the same time as the pressure of the steam in th pressure cooker, thus preventing loss of liquid from the jars. The lids are securely sealed to the jars as the jars complete their cooking cycle.

4 Claims, 4 Drawing Figures

QUICK COOLING PRESSURE COOKER SYSTEM

BACKGROUND AND SUMMARY OF THE INVENTION

The invention relates to "pressure cooking canners" and to means for facilitating cooling of containers therein after completion of a cooking cycle.

In many underdeveloped countries of the world, virtually none of the food produces is canned. Thus, while a sufficient total quantity of food may be grown within a country to last its inhabitants throughout the year, the actual consumable quantity of food may still not be sufficient to meet consumption needs. To alleviate such problems, canning centers may be set up various areas to accept food from large numbers of people and to can it in quantity on the premises. Pressure cookers used in such centers, while not usually as large as in commercial canning facilities, are large enough to economically handle sufficient quantities of food.

While pressure cookers for use in such canning centers are well known (see U.S. Pat. No. 2,555,230, which is incorporated herein by reference) there are several problems associated with their operation. Since the time required for the cooling cycle of a pressure cooker (retort) varies between twenty to 45 minutes depending upon the product being processed, there is a need to reduce the cooling time to enable more food to be processed within a given time (Attempted removal of product before the cooling cycle of the cooker has been completed — i.e. before a zero pressure reading on the steam gauge — could result in injury and or damage). If a reduction in retort pressure occurs prior to a corresponding reduction in pressure within the retort-enclosed food containers, the containers will break or food and liquid will leak from the containers. Some efforts to reduce the cooling cycle involve the application of pressurized air into the retort while the steam is condensing to maintain the pressure while the containers are being cooled. This, of course, requires the addition of an air compressor to the canning center.

According to the method and apparatus of the present invention, both of the above-mentioned problems inherent in prior art devices are avoided. According to the present invention the cooling cycle time is approximately 4 minutes and is usually less than 2 minutes. This results in a total cooling time before the cooker can be opened of approximately 1/10 that inherent in the prior art and increases the cooker production capacity by 25 – 40 percent. In addition, the need for an air compressor is eliminated since the pressure within the containers is effectively and reliably reduced prior to or at least contemporaneously with the reduction in pressure in the cooker. Accordingly, there is no need for an air compressor to maintain the pressure in the cooker at a particular level as in the past.

In prior art pressure cookers, as shown in U.S. Pat. No. 2,555,230, pressurized air is introduced into the retort and a fine mist of water is sprayed into the interior of the retort chamber from nozzles located on the cover thereof after the steam supply is terminated. The water delivery is always maintained in the form of a fine spray since slugs of cold water contacting the hot jars would be almost certain to cause breakage thereof.

According to the present invention, however, the water is delivered in direct streams rather than a spray. Further, the water streams are directed onto selected metal lids of the glass jars (food containers) within the retort. The water stream contacting the metal lid does three things: [1] the water stream quickly cools the jar lid and reduces the pressure within the jar faster than or at the same rate as the pressure is reduced around the jar to insure reliable fast sealing of the lid onto the jar; [2] the water absorbs sufficient heat from the lid to insure that it does not cause breakage of the jars when it subsequently flows down the jar sides to further cool the jars; and [3] a portion of the water vaporizes in the process thereby preventing too rapid a reduction in the retort pressure around the jars. Thus quick and safe removal of the containers from the retort is facilitated. After the jars are removed from the retort, they are further cooled to room temperature, such further cooling resulting in tight sealing of the lids on the jars. Thus it will be seen that the simple provision of a means for directing a stream of water on selected ones of the initially loose fitting metal tops of the jars within the retort eliminates the need for a compressor and reduces the time of the cooling cycle of the retort from 20 – 45 minutes to less than 4 minutes.

The preferred apparatus according to the present invention includes a means for positively locating the jars within the container and for positively locating the stream directing means with respect to the interior of the retort so that the streams will in fact be directed on various metal tops of the jars. It is not absolutely necessary that the top of every jar within the retort have a stream of water directed thereon. For example, when there are two layers of containers (which is a normal situation), the jars in the second layer need not have water directed on the tops thereof. Rather, the second layer jars merely receive the water dripping down from the top layer jars and the total cooling cycle for both layers of jars will still be no longer than the 4 minutes. Similarly, when in place of the normal sized (i.e. quart) jars that are used in the retort smaller sized (i.e. pint) jars are used, there will be more jars than there are water streams; thus only about ⅔ of the jars on the top layer will have a stream of water directed against their lid tops. With delivery of an adequate volume of water there is sufficient water vaporization, so that all the jars on the top layer will be cooled — and similarly the jars on the second layer — within 4 minutes.

The primary object of this invention is to provide an improved method and apparatus for food processing. This and other objects of the invention will become clear upon an inspection of the detailed description of the invention and the appended claims.

DETAILED DESCRIPTION OF THE INVENTION

Figure 1:
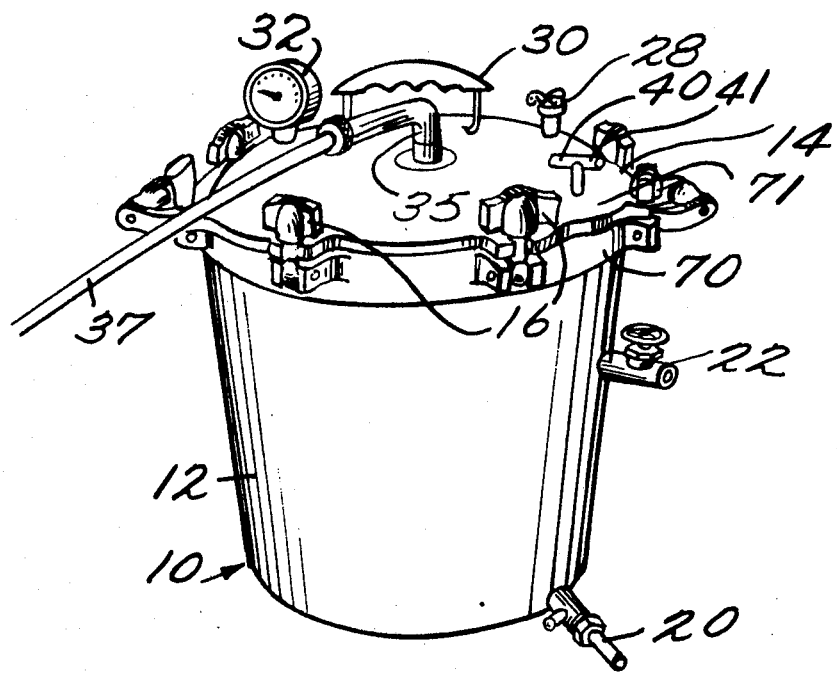
FIG. 1. is a perspective view of an exemplary pressure cooker incorporating the teachings of the present invention and for practicing the method of the present invention.

An exemplary pressure cooker incorporating the apparatus of the present invention and for use in practicing the method of the present invention is shown generally at 10 in FIG. 1. The retort 10 includes a bottom portion 12 and a lid 14 therefor adapted to be placed in sealing engagement with the bottom 12. A plurality of latching means 16 mounted on bottom portion 12 are adapted to engage portion 17 on lid 14 and be screwthreaded into tight engagement therewith thereby effecting a seal between the lid 14 and bottom 12.

Connected to the bottom 12 of the retort 10 there is preferably a lower exhaust valve 20, and a steam supply valve 22 connected to any suitable supply of steam under pressure (not shown). Located on the exterior (top) of the lid 14 may be an upper exhaust valve 28, a handle 30 for lifting the lid 14 off the bottom 12 when the latching means 16 are not in latching condition, a pressure gauge 32 for indicating the pressure within the retort 10 when operating, a water conducting member 35 adapted to receive a hose 37 (which is adapted to be connected to a source of water) and transmit water from the hose 37 to the interior of the retort 10, a pressure relief valve 40, and a vacuum relief valve 41. The valves 20, 28, 40 and 41, and gauge 32 may be of any conventional types.

Figure 2:
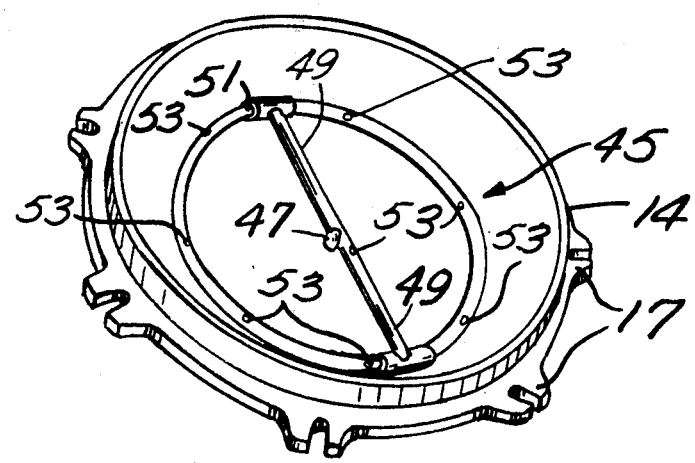
FIG. 2 is a perspective view of the bottom of the lid shown in FIG. 1 illustrating exemplary water stream directing means according to the present invention.

As clearly shown in FIG. 2, the bottom of the lid 14 contains apparatus, shown in exemplary form generally at 45, for directing a stream of water from the hose 37 and member 35 directly on selected metal lids of jars located within the retort 10. In the preferred embodiment shown, the means 45 includes a water conducting connection member 47 connected to the member 35 on the exterior of lid 14, a pair of tubes 49 each leading from the member 47, and a tubular ring 51 connected in water conducting relationship with the tubes 49 and having holes 53 formed therein. The water conducted by members 47 and 49 is directed through holes 53 in ring 51 to the metal tops of jars located within the retort 10. The holes 53 are preferably drilled into the ring 51 to provide a "clean" hole that insures that water flowing therethrough will be directed properly, and are 1/32 to 1/64 inches in diameter when the ring 51 has a diameter of about ⅛ inches.

It will be obvious to one of ordinary skill in the art that means other than the ring 51 with holes 53 therein may be utilized to direct water onto the tops of jars within the retort 10; for instance a plurality of radially extending arms may extend from the member 47, each arm having a water directing hole or nozzle therein. Other means are also possible.

Figure 3:
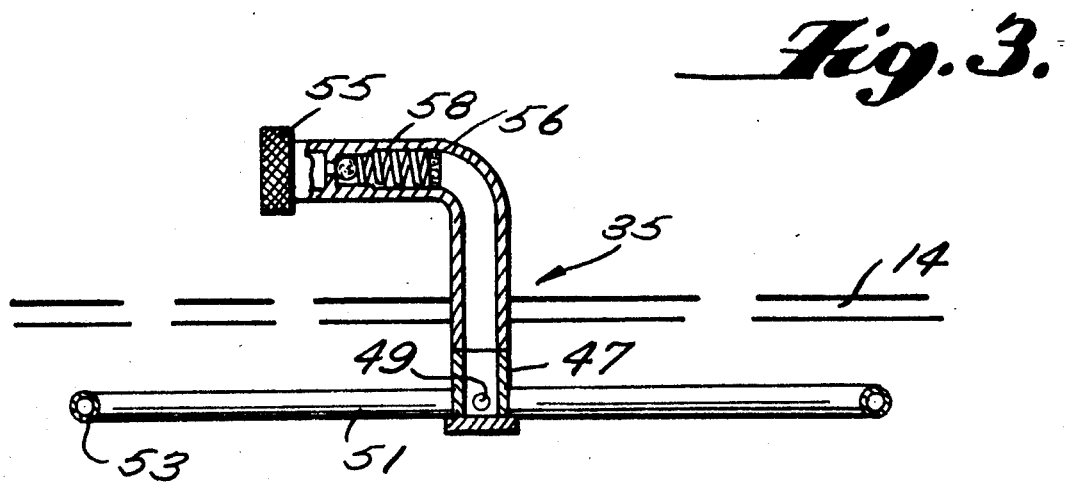
FIG. 3 is a cross-sectional view of various components of the water introducing means shown in FIGS. 1 and 2.
Figure 4:
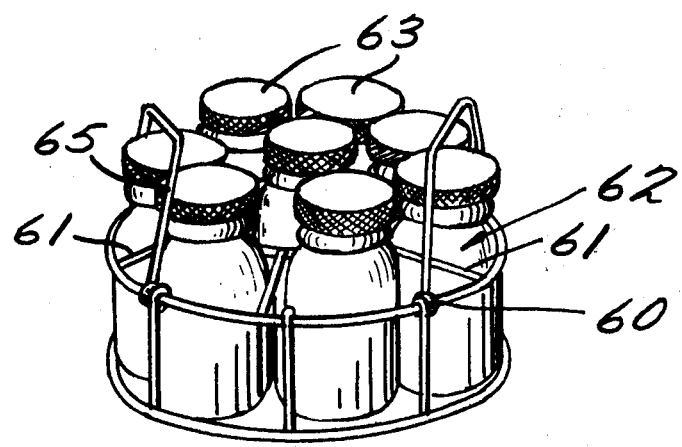
FIG. 4 is a perspective view showing jars having material therein to be processed in an exemplary jar basket for use with the apparatus shown in FIG. 1.

A cross-sectional detail view of the member 35 is shown in FIG. 3. The member 35 includes a quick connect-disconnect coupling 55 for cooperation with the hose 37, a screen 56 for filtering out particulates from water introduced under pressure through the member 35, and a spring-pressed ball check valve 58 to allow introduction of water but to prevent the release of steam from the retort 10 therethrough.

The containers within the retort that are to have the product therein processed are preferably disposed within the bottom portion 12 of the retort in baskets, such as 60. In practice, it is preferred to have the baskets 60 dimensioned so that eight glass quart jars 62 are positively located by dividing members 61 in each basket 60, and that two baskets 60 are disposed within the bottom portion 12 of each retort 10, one on top of the other.

Basket 60 is provided with an arrow 66 which permits the operator to properly place the basket in the retort 10 by aligning arrow 66 with arrow (indicator) 70 disposed on bottom 122 of retort 10. The arrow 71 disposed on lid 14 is also aligned with arrow 70 to thus ensure that the jars and all parts of the pressure cooker are properly aligned.

In cases where it is desired to process food in pint jars, 12 pint jars may be placed in each basket, again two layers of baskets being provided. Alternatively, three layers of 8 jars each may also be used.

Each jar 62 has a lid 63 which may be composed of metal or similar material. Preferably, the lids are of the conventional type that have a sealforming material disposed on the bottom thereof for engagement with the rim of the jar 62. However, other conventional sealing means such as a zinc cap and rubber ring may be used with satisfactory results.

Before processing in the retort 10, the lids 63 are placed on the filled jars 62 and the metallic bands 65 are screwed thereon to hold the lids on during the processing procedure. While the bands hold the lids on fairly tightly to prevent leakage from the jars during processing, no actual "seal" is provided until further cooling of the jars after removal from the retort after processing; the lids may thus be considered to be placed on "relatively loosely" when placed in the retort although chance of product leakage therethrough is minimized even when first put in the retort 10. It is also noted that while the lids 63 are preferably formed of metal (i.e. steel), other materials that are non-toxic, can provide sealing, longlasting engagement through a gasket arrangement with a jar, which will not shatter when subjected to thermal shock and which will provide high heat conductivity.

Any suitable means may be provided for ensuring that the streams of water from the holes 53 will be directed upon the lids 63 of selected jars 62 within the retort 10 rather than on the jars 62 themselves. A simple preferred way of doing this is merely to place an arrow 66 on the basket 60 that must be lined up with an arrow on the bottom portion 12 of the retort 10 (since the basket 60 is divided up into sections with a jar within each section, this will positively locate each jar at the same position relative to the retort each time), and by placing an arrow 71 on the lid 14 that must be lined up with an arrow 70 on the bottom 12 of the retort each time the lid is placed on the bottom. Since the holes 53 have their positions fixed with respect to the lid 14, this will ensure that the holes are always in the same location relative to the bottom 12. Other means that could be provided for positively ensuring that the streams of water will always be directed on the lids of the jars are notches on the basket 60 and lid 14 for engagement with notches on the bottom 12, particular geometrical shapes of the various members that will interfit in only one position, etc.

Although it is preferred that a stream of water be directed on the top of each jar within the top layer of jars within the retort, this is not essential for rapid in retort cooling according to the teachings of the present invention as long as enough water is supplied to cause sufficient cooling of all the jars and as long as no streams of water are directed on any portion of the jars besides the lids 63. For instance, when a product in pint jars is being processed, a basket (not shown) therefor will positively locate 12 pint jars so that the lids of eight of them are directly under the holes 53 in the tube 51; directing streams of water on only eight of the twelve jars in the top layer still results in the reduced in retort cooling time of the present invention, however, as long as a sufficient amount of water is provided. Although the cooling means 95 has been shown with eight stream-directing holes 53, it is obvious that any number could be provided as long as a cooperating number of jars is provided within the retort 10.

Preferred apparatus according to the invention having been described, the procedure of operating the apparatus will now be set forth. In operating the apparatus shown in the drawings the following steps should be followed: [A] Place the basket 60 filled with jars 62 (having lids 63 disposed thereon) into the bottom of retort 10 making sure that the arrow 66 thereon is aligned with the arrow 70 on the bottom 12. [B] Place the lid 14 on the bottom 12 making sure that the arrows 71 and 70 are properly aligned and tighten down the latching means 16. [C] Open exhaust valves 20 and 28. [D] Open the steam supply valve 22 thereby injecting steam into the retort 10. [E] After supplying steam of sufficient pressure for a predetermined amount of time close the upper exhaust valve 28. [F] Close lower exhaust valve 20 and slightly reopen same to thus enable any condensation or air present in the retort during the cooking cycle to escape therethrough. Since air and condensate are heavier than steam, they settle to the bottom of the retort. It is important that the condensate and air be exhausted from the retort in order that the pressure within the retort will accurately indicate the temperature within the retort during the cooking cycle to thus kill pathogenic micro-organisms within the food being processed. [G] After the cooking cycle, close lower exhaust valve 20. [H] Fit the quick connect coupling hose 37 to the coupling 55 of member 35. [J] Close steam valve 22. [K] Turn on water to which hose 37 is connected (preferably a source at a pressure about 5 psi higher than the pressure within retort 10), whereby water will be directed through members 35, 47 and 49 and through holes 53 in ring 51. The water falls onto the lids 63 of the first layer of jars within the retort which: (a) cools the jars and the product therein and (b) reduces the pressure within the jar faster or at the same rate as the pressure of the steam in the retort is reduced. [L] One minute after the gauge 32 reads "zero" open the upper exhaust valve 28 and then turn off the water supply to hose 37. [M] Disconnect the hose 37 from member 35, unscrew latching means 16, remove the lid 14 from the retort, and remove the jar baskets 60 from bottom portion 12 of the retort for further cooling. Since the lids 63 will be tightly sealed on the jars after further cooling, the metal bands 65 are superfluous and may be removed from the jars.

It will thus be seen that a method and apparatus for processing food has been provided which results in a fantastic decrease in the retort cooling time required (and thus a great increase in the overall production possible per unit time), and eliminates the need for an air compressor. The method of the invention comprises the steps of subjecting food packed into relatively loosely sealed containers and in a confined volume to steam under pressure for a predetermined period of time, terminating application of steam under pressure to said containers in said confined volume after said predetermined period of time, and facilitating quick, safe removal of said containers from said confined volume by simultaneously cooling said containers and reducing the pressure within said containers before or at the same time as the pressure of said steam in said confined volume surrounding said containers is reduce (by directing streams of cooling water on selected lids of metal or the like of the jars within the confined volume). According to prior art methods, the removal of the containers from the confined volume was not accomplished by simultaneously cooling the containers and reducing the pressure within the containers before or at the same time as the pressure of said steam in the confined volume surrounding the containers was reduced, but rather by increasing the pressure within the retort by the introduction of air under greater pressure than the steam pressure within the retort during cooling. Obviously, the method of the invention obviates the need to provide a means for supplying air under pressure to the retort during cooling, while accomplishing the cooling much more quickly and without increased chance of breakage of the jars due to thermal shock.

It will be apparent that an improved method and apparatus have been disclosed which greatly reduced the in retort cooling time for a food processing cycle of a pressure cooker, and eliminate the prior art need for an air compressor. While the apparatus and method have been shown in what is presently conceived to be the most practical and preferred embodiment, it is apparent that many modifications thereof may be made within the scope of the invention, which scope is not to be limited except by the appended claims.

What is claimed is:

1. A method of processing food comprising the steps of sequentially
   a. subjecting food packed into separate relatively loosely sealed glass containers and in a confined volume to steam under pressure for a predetermined period of time, each of said containers being relatively loosely sealed with a lid of metal,
   b. terminating application of steam under pressure to said containers in said confined volume after said predetermined period of time, and
   c. directing a stream of cooling water directly on at least selected ones of said metal lids of containers within said confined volume, while preventing said stream of water from being directed squarely on said glass containers, to facilitate quick, safe removal of said containers from said confined volume.

2. A method as recited in claim 1 comprising the further step of tightly seaing said containers by removing them from said confined volume for further cooling.

3. A method of processing food comprising the steps of substantially sequentially
   a. packing the food to be processed into separate glass containers,
   b. relatively loosely sealing said containers with a lid of metal,
   c. loading the loosely sealed containers into the processing chamber of a retort,
   d. maintaining each such container in a substantially upright position in the retort with the lid thereon uppermost,
   e. introducing steam under pressure to the interior of said retort,
   f. maintaining the interior of the retort under steam pressure for a predetermined period of time,
   g. terminating introduction of steam into said retort after said predetermined period of time, and
   h. directing a stream of cooling water directly on at least selected ones of said metal lids on containers in said retort while preventing said stream of water from being directed squarely on said glass containers, to facilitate quick, safe removal of said containers from said retort.

4. A method as recited in claim 3 comprising the further step of tightly sealing said containers by removing them from said retort for further cooling.

* * * * *

UNITED STATES PATENT AND TRADEMARK OFFICE
CERTIFICATE OF CORRECTION

PATENT NO. : 3,983,260
DATED : September 28, 1976
INVENTOR(S) : Karl L. FORD

It is certified that error appears in the above-identified patent and that said Letters Patent are hereby corrected as shown below:

Item [21], change "567,994" to --507,994--.

Item [57], ABSTRACT, line 9, change "th" to --the--.

Column 1, line 15, after "up" insert --in--.

Column 4, line 2, delete the numeral "122" and substitute therefor --12--.

Column 5, line 64, delete "reduce" and substitute therefor --reduced--.

Signed and Sealed this

First Day of May 1979

[SEAL]

Attest:

RUTH C. MASON
Attesting Officer

DONALD W. BANNER
Commissioner of Patents and Trademarks